United States Patent [19]

Rich et al.

[11] Patent Number: 4,947,630
[45] Date of Patent: Aug. 14, 1990

[54] GOLF GREENS MOWER WITH SELF-CLEANING GROUND CONTACTING ROLLERS

[76] Inventors: Frank C. Rich, 13195 Maple Ave., Cato, N.Y. 13033; Larry R. Keysor, R.D. #2, Weedsport, N.Y. 13166

[21] Appl. No.: 416,827

[22] Filed: Oct. 3, 1989

[51] Int. Cl.⁵ .................... A01D 34/52; A01D 55/20
[52] U.S. Cl. ........................... 56/249; 56/7; 56/252
[58] Field of Search ............... 56/249, 252, 16.6, 16.9, 56/17.1, 17.2, 6, 7

[56] References Cited

U.S. PATENT DOCUMENTS

| | | | |
|---|---|---|---|
| 2,032,784 | 3/1936 | Worthington | 56/7 |
| 2,528,116 | 10/1950 | Clemson | 56/249 |
| 3,662,528 | 5/1972 | Akgulian et al. | 56/249 |
| 3,680,293 | 8/1972 | Klemenhagen | 56/249 |
| 3,759,022 | 9/1973 | Snyder et al. | 56/252 |
| 4,021,996 | 5/1977 | Bartlett et al. | 56/7 |
| 4,481,757 | 11/1984 | Tsuchiya | 56/16.9 |
| 4,644,737 | 2/1987 | Arnold | 56/7 X |
| 4,887,418 | 12/1989 | Pelletter | 56/249 X |

Primary Examiner—Thuy M. Bui
Attorney, Agent, or Firm—Wall and Roehrig

[57] ABSTRACT

A reel type golf greens mower having three mowing units, each unit having a front and a rear ground contacting roller and a second smaller diameter rotatably mounted rod in rotational contact with the ground contacting roller for automatically removing grass clippings from the ground contacting rollers.

12 Claims, 2 Drawing Sheets

GOLF GREENS MOWER WITH SELF-CLEANING GROUND CONTACTING ROLLERS

BACKGROUND OF THE INVENTION

This invention relates to golf greens mowers, and more particularly to reel type precision mowers for accurately cutting the grass on golf greens to an exact height, which have forwardly and rearwardly disposed ground contacting rollers on either side of a cutting reel and bedknife for cutting the grass.

Mowers of this type are generally adjusted for cutting height by raising or lowering one of the ground contacting rollers, either the forward or the rearward one relative to the cutting reel. Numerous patents in the art show ways for doing this in a precise and repeatable manner for providing the precise grass height on greens to insure the desired playing conditions. The grass on greens is cut with such precision that it has been found that if the grass clippings are allowed to build up on the ground contacting roller, that it can change the height of cut sufficiently over time to effect the playing condition of the green surface.

This generally in the past has necessitated frequent cleaning of the ground contacting rollers, particularly when the greens are wet and has been an inconvenience and an undesirable cost in the maintenance of the golf greens.

In U.S. Pat. No. 4,021,996 to Bartlett, there is a power driven helical brush positioned adjacent the rear ground contacting roller when in the low greens cutting position for removing cut grass clippings, dirt, etc. In the "collar" grass cutting position the roller is ineffective, Bartlett not believing it necessary for that application.

The Bartlett reference, while showing a means for cleaning the rear ground contacting roller when in the low greens cutting position, provides a brush type roller that not only will wear over time and require frequent replacement, but it also being in a helical configuration, will allow grass to be thrown up and accumulate between revolutions of the ground contacting roller so that over time a build up can gradually occur, even though the brush hits the ground contacting roller once every three, four, or five revolutions, as the case may be. Thus, while Bartlett was an improvement over the prior art at the time of the filing of the Bartlett patent, this showing had inherent limitations which to some degree prevented its universal adoption and use.

Applicant has found with the present invention that instead of the complicated belt driven cylindrical helical brush of the Bartlett reference, that a simple rotatably mounted rod in frictional contact with the ground contacting roller (both forward and rearward) will prevent buildup of grass clippings and maintain the precise adjustment of the cutting height.

OBJECTS AND SUMMARY OF THE INVENTION

Accordingly, it is an object of the present invention to provide an improved means for preventing buildup of grass clippings on ground contacting rollers that determine the cutting height of a reel type mower.

It is another object of the present invention to provide a simple maintenance-free means to prevent build up of grass clippings on the ground contacting rollers of reel type greens mower.

It is another object of the present invention to provide a means for preventing buildup of grass clippings on the ground contacting roller of a reel type mower that will not wear and require constant adjustment and replacement.

It is a still further object of the present invention to provide a simplified and inexpensive means of preventing buildup of grass clippings on ground contacting rollers of a reel type mower such that it can be affixed to both front and rear ground contacting rollers to maintain precise cutting height adjustment during the use of the reel mower on the greens.

It is a still further object of the present invention to provide a simple and economical means for continuously cleaning the ground contacting rollers of greens mowers to remove grass clippings and the like so that cutting height will not be effected and operator time is not required to maintain precise cutting height.

BRIEF DESCRIPTION OF THE DRAWINGS

Further objects of the invention, together with additional features contributing thereto, and advantages accruing therefrom will be apparent from the following description of a preferred embodiment of the invention, which is shown in the accompanying drawings with like reference numerals indicating parts throughout wherein.

DETAILED DESCRIPTION OF THE PREFERRED EMBODIMENT

Figure 1:
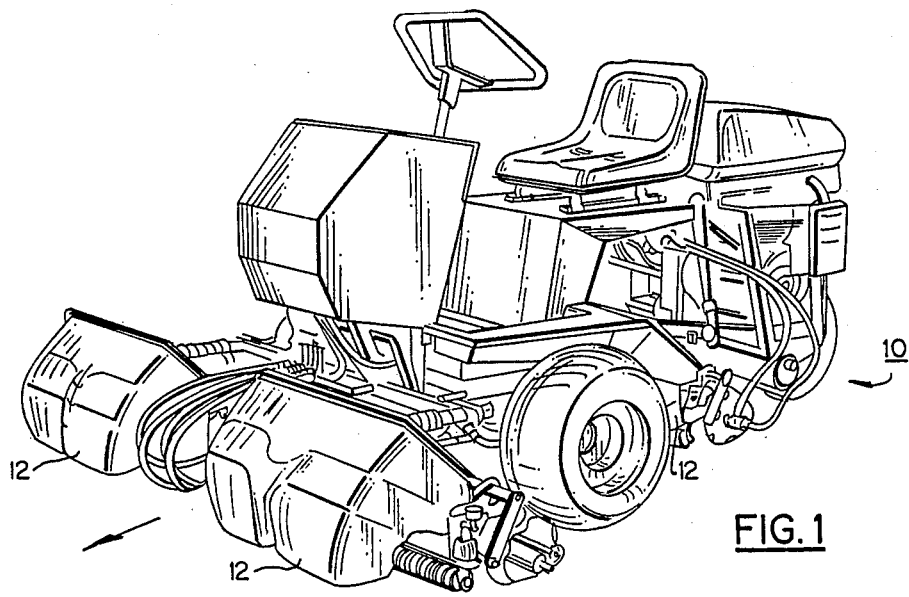
FIG. 1 is a perspective view of a mower in accordance with the invention.

Referring now to FIG. 1, there is shown a typical power driven riding mower 10 of the golf greens type having three separate mowing units 12 controlled and powered from the tractor. The basic tractor of the mower unit 10 forms no part of the present invention, and will not be described in detail. For details as to structure and assembly of one form of this type of unit, reference may be had to the Jacobsen operator's and owner's manual for the "Greens King IV TM", product No. 62221, Ser. No. 5574 and up.

The mower 10 has three cutting units 12 which can be seen, two in front of the tractor and one mounted behind the drive wheels of the tractor in between so as to give a uniform and complete cutting pattern just shy of three times the width of a single mowing unit 12.

Figure 3:
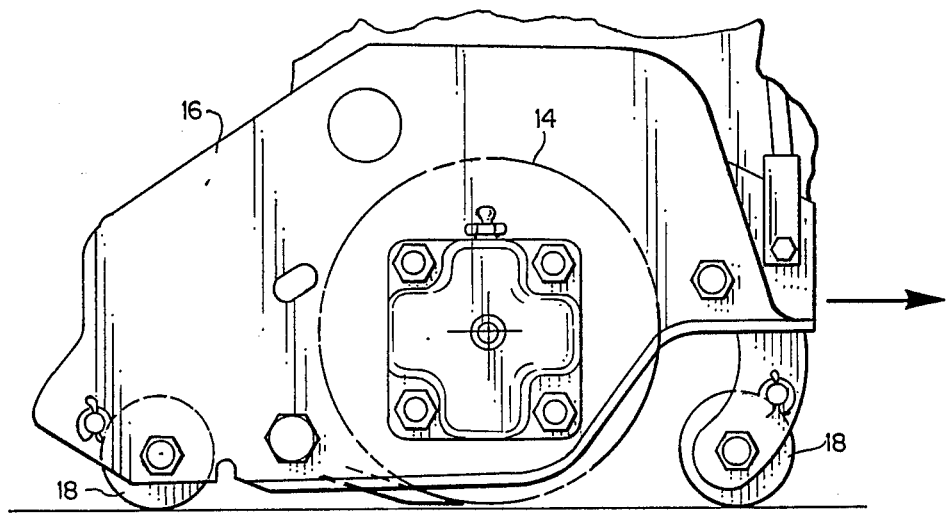
FIG. 3 is an end view of a reel mowing unit in accordance with the present invention.
Figure 4:
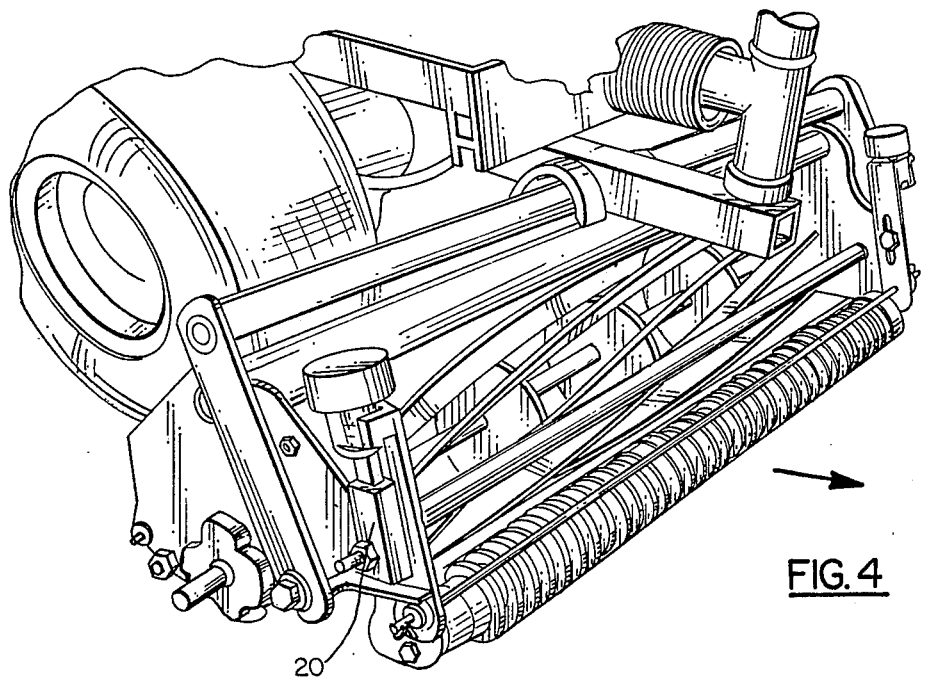
FIG. 4 is a perspective view from the front side of a reel mowing unit embodying the present invention.
Figure 5:
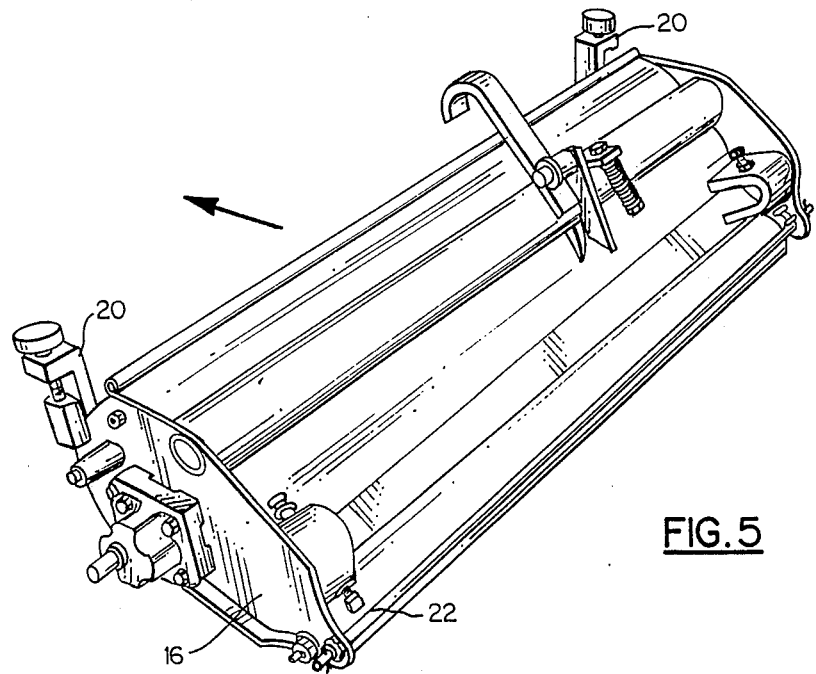
FIG. 5 is a rear perspective view of a unit similar to the unit shown in FIG. 4.

Each mowing unit 12, as may be seen perhaps more clearly in FIGS. 3-5 has a basic rotary reel type of cutter 14 mounted in end frame members 16 spaced apart the desired distance. Each mowing unit has a pair of ground contacting rollers 18, one mounted in the front of the unit, and one mounted at the rear of the unit. The roller mounted at the front of the unit has an adjusting mechanism 20 on each side frame, which is used in the conventional manner to adjust the cutting height of the mowing unit.

As may be seen in FIG. 4, the ground contacting roller 18 may be a series of spaced apart individual rollers giving a somewhat serrated look to the ground contacting roller in the front part of the unit, and as shown in FIG. 5, it may be a solid roll. The serrated roll, it is believed, allows the grass to be maintained in a more erect fashion for cutting, while the solid roller tends to smooth the cut green and to help maintain it in a flat, playable condition.

Figure 2:
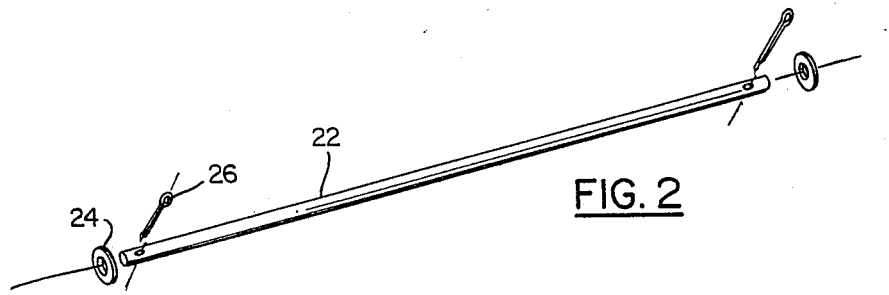
FIG. 2 is a perspective view of the roller contacting cylindrical rod of the present invention.

Rotatably mounted in the end frame 16, adjacent each ground contacting roller 18 is a cylindrical rod 22. Rod 22, as may be seen in FIG. 2 is a straight cylindrical steel or plastic rod that is mounted in holes in the side plates 16 and held in place by washers 24 and cotter pins 26 at each end so that the rod 22 may freely rotate in contact with its adjacent ground contacting roll 18. As can be seen, this rod is provided on both the front and the rear ground contacting roller means 18 and is mounted generally toward the top of the roll away from the ground. As will be seen in FIGS. 4 and 5, the rods extend through the side frames and therefore completely across the entire face of the ground contacting rollers 18.

Thus, as grass clippings are picked up primarily, of course, by the following roller 18, the rod 22 tends to strip any grass clippings that adhere to the roller 18 through the rotary action caused by its frictional contact with the roller 18. This action prevents build up of grass clippings such as occurs in prior devices where buildup has continued to such an extent that it has effected the cutting height of the mowing head. The same effect is obtained on the forward ground contacting roller, whether it be solid or sectionalized, as shown in FIG. 4, which also in the Jacobsen device, specifically controls the height of cut adjustment. (The front and back of the mowing units are indicated by the arrow showing the direction of travel used to mow greens.

Other types of mowing units have the rear roller adjustable to control cutting height, but in either case, unwanted buildup of grass clippings on one or both of the rollers will increase the diameter thereof, and will change the cutting height to a greater or lesser extent, depending on which roller and how much build up. A small diameter shaft 22 thus provides a very simple, fool-proof and economically effective way of preventing buildup of grass clippings on the main mowing unit ground contacting rollers.

The ground contacting rollers are generally on the order of two to four inches in diameter and it is found that the buildup rollers 22 can be on the order of one-half inch to one inch diameter.

While in the preferred form, as shown, the rods 22 are actually rotatably mounted and free to rotate with the ground contacting roller providing the scrubbing action necessary to prevent buildup of grass clippings, the rods 22 could be fixed in the form of rectangular or scraper blade configurations to scrape off, rather than to scrub off the grass clippings as they may be picked up by rotation of the ground contacting roller. The rollers, as shown, reduce wear and prolong life of not only the ground contacting roller, but the grass clipping removing means roller.

As may be seen specifically in FIG. 2, the small diameter rods 22 are mounted in surface contact with the larger ground contacting rollers 18. This means that the smaller rollers 22 will rotate at a much higher rpm than the rpm of the ground contacting roller. This action, it is believed, imparts a vibratory and scrapping action to the smaller roller which facilitates the removal of unwanted grass clippings from the larger, slower rotating, ground contacting roller. Thus, a sort of scrubbing action is generated at the interface of the two rollers as they rotate to keep them clean of grass clippings.

While the invention has been described in the specification and illustrated in the drawings with reference to a preferred embodiment, it will be understood by those skilled in the art that various changes may be made and equivalents may be substituted for elements of the invention without departing from the scope of the claims.

What is claimed is:

1. In a golf greens type mower having at least one reel mowing unit, said unit having a frame, a rotatable grass cutting reel and bed plate, a pair of rotatable ground engaging members mounted forwardly and rearwardly and in parallel alignment with said cutting reel, means for removing grass clippings from said rotatable ground engaging members comprising;
   an elongated separate member rotatably mounted in said frame adjacent said forward and rearward ground engaging members,
   each said separate rotatably mounted member being positioned for rotating contact with the adjacent rotatable ground engaging member,
   so that grass clippings are prevented from building up on said rotatable ground engaging member.

2. A device as described in claim 1 wherein said separate rotatably mounted member comprises an elongated cylindrical bar in frictional contact with said rotatable ground engaging member.

3. A device as described in claim 2 wherein said separate rotatably mounted bar extends along the entire length of said rotatable ground engaging member.

4. A device as described in claim 1 wherein said elongated separate members are rotated at a significantly higher rpm than said ground engaging members.

5. A device as described in claim 4 wherein said elongated separated member has an effective diameter that is a small fraction of the diameter of said rotatable ground engaging members.

6. A golf greens type mower having at least one reel mowing unit comprising: a pair of spaced apart frame members, a rotatable grass cutting reel and a bed plate mounted between said frame members; a pair of elongated ground contacting rollers mounted in said frame members, one forwardly and one rearwardly of said cutting reel; a pair of cylindrical members rotatably mounted adjacent said forward and rearward ground contacting rollers, said pair of rotatably mounted cylindrical members being of smaller diameter than said ground engaging rollers and in contact therewith so that grass clippings are prevented from building up on said rotatably mounted ground engaging rollers.

7. A golf greens type mower as described in claim 6 wherein said pair of rotatably mounted cylindrical members comprise a cylindrical steel rod extending from side frame to side frame, disposed along each of said rotatably mounted ground engaging members, said elongated steel rods being positioned in rotating contact with said rotatable ground engaging members.

8. A device as described in claim 6 wherein said pair of rotatable cylindrical members comprise a plastic rod having a diameter less than one quarter the diameter of the rotatably mounted ground engaging roller which it engages.

9. A device as described in claim 6 wherein said cylindrical rotatable members comprise an elongated rod mounted in frictional engagement with said ground engaging members throughout the entire length thereof.

10. A golf greens type mower having at least one reel mowing unit comprising: a pair of spaced apart frame members, a rotatable grass cutting reel and a bed plate mounted therebetween, a pair of rotatable ground engaging members mounted forwardly and rearwardly and in parallel alignment with said cutting reel, an elongated separate member mounted in said frame members adjacent each said forward and rearward ground engaging members, each said separate member being mounted in frictional contact with the adjacent rotary ground engaging member, so that grass clippings are prevented from building up on said rotatable ground engaging member.

11. A golf greens type mower as described in claim 10 wherein said elongated separate member comprises an elongated cylindrical bar rotatably mounted in said frame members.

12. A golf greens type mower as described in claim 10 in which said rotatable ground engaging members respectively comprise a cylindrical roller and a plurality of individual rollers spaced apart across the entire width of the frame of said mower, and said elongated separate rotatable members comprise a cylindrical rod extending from side frame to side frame along said cylindrical roller and along said multiple roller members in rotating contact therewith.

* * * * *